Feb. 20, 1962 H. J. LANDAU 3,022,473

SIGNAL RECOVERY CIRCUITS

Filed Aug. 18, 1959

RECOVERY CIRCUIT 14

INVENTOR
H. J. LANDAU

BY R. O. Nimtz

ATTORNEY 3,022,473
Patented Feb. 20, 1962

3,022,473

SIGNAL RECOVERY CIRCUITS

Henry J. Landau, Summit, N.J., assignor to Bell Telephone Laboratories, Incorporated, New York, N.Y., a corporation of New York Filed Aug. 18, 1959, Ser. No. 834,611
6 Claims. (Cl. 333—28)

Figure 1:
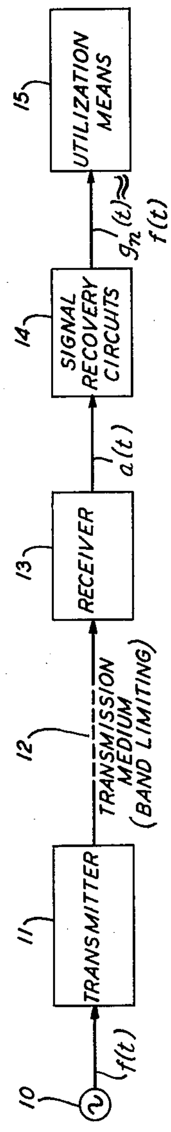

This invention relates to signal transmission systems and, more particularly, to the distortionless reception of compressed and subsequently band-limited intelligence signals.

In telephone and other signal transmission systems it is often desirable to transmit signals having a considerable range of amplitudes. The range which can be effectively transmitted, however, is sometimes limited by the characteristics of the transmission medium. It is necessary, for example, that the minimum transmitted amplitude level be maintained above the level of the noise introduced by the medium, and that the maximum transmitted amplitude be maintained below the level at which the transmission medium is overloaded.

Amplitude range compression and expansion systems (companding systems) are commonly used to avoid the amplitude limitations of transmission media. That is, signals with a wide amplitude range are introduced into a non-linear device (a compressor) which reduces the amplitude of high level signals and increases the amplitude of low level signals, thus compressing the amplitude range of the signal. These compressed signals are then transmitted over the transmission medium having a limited amplitude capacity. At the receiving end of the system, a non-linear device inverse with respect to the compressor (i.e., an expandor) restores the original amplitude range of the signals. Such companding systems have found considerable application in the transmission of signals having wide amplitude ranges.

Signal transmission media, however, normally have a limited bandwidth as well as limited amplitude range capacity. Since the compressor normally introduces higher frequency components into the compressed signal than were present in the original signal, these higher frequency components may fail to reach the expandor. The loss of these signal components results in distortions of the expanded signal and therefore reduces the value of the overall compandor system.

It is an object of the present invention to increase the usefulness of compandor systems by reducing the distortion caused by bandwidth limitations of the transmission medium.

It is another object of the invention to remove distortions in compressed signals which have been transmitted through systems of limited bandwidth.

It is a more particular object of the invention to recover a substantially undistorted signal from a compressed signal distorted by the bandwidth limitations of a transmission medium.

In accordance with the present invention, these and other objects are attained by passing a compressed and band-limited signal through successive stages of a signal recovery circuit which operates upon the distorted signal in such a manner as to reduce the amount of distortion in the signal. Each stage of the signal recovery circuit operates upon the output of the previous stage to further reduce the distortions of the signal. In this way, a sufficient number of stages produces an output signal which is as close to the undistorted signal as desired. In an actual system, of course, the number of stages used will depend upon the degree of fidelity required as measured against the cost of additional stages.

From the above discussion it can be seen that the present invention performs a number of successive approximations, in a corresponding number of stages, to obtain an output which is closer and closer to a completely undistorted signal. That is, each stage of the recovery circuit operates upon the output of the previous stage to produce a signal which is closer to the undistorted signal than was the output of the previous stage. Given a sufficient number of stages, therefore, as close an approximation as desired to the undistorted signal is possible.

Each stage of this approximating circuit comprises a network which duplicates the non-linear operations of the system, i.e., compressing and band limiting. The output of the previous stage is introduced into this network and then subtracted from the distorted input signal. This difference is then combined with the output of the previous stage to form a signal which is closer to the undistorted signal. That is, the difference between the distorted signal and the signal which has been operated upon by a network simulating the system is taken as a measure of the distortion produced by the system on that signal. This difference is therefore combined with the distorted signal to produce a new signal which is less distorted and therefore a closer approximation to the input signal.

It will be noted that all of the operations described above can be accomplished at the receiving end of the transmission system. The recovery circuit of the present invention may therefore be merely connected onto an existing system without any modifications in the system. Furthermore, the degree of fidelity obtainable with the present invention may be easily adjusted by adding or removing stages. These advantages make the recovery circuits of the present invention extremely flexible, adaptable to almost any non-linear, band-limited signal transmission system.

These and other objects and features, the nature of the present invention and its various advantages, will be more readily understood from a consideration of the attached drawing and the following detailed description of the drawing.

Figure 2:
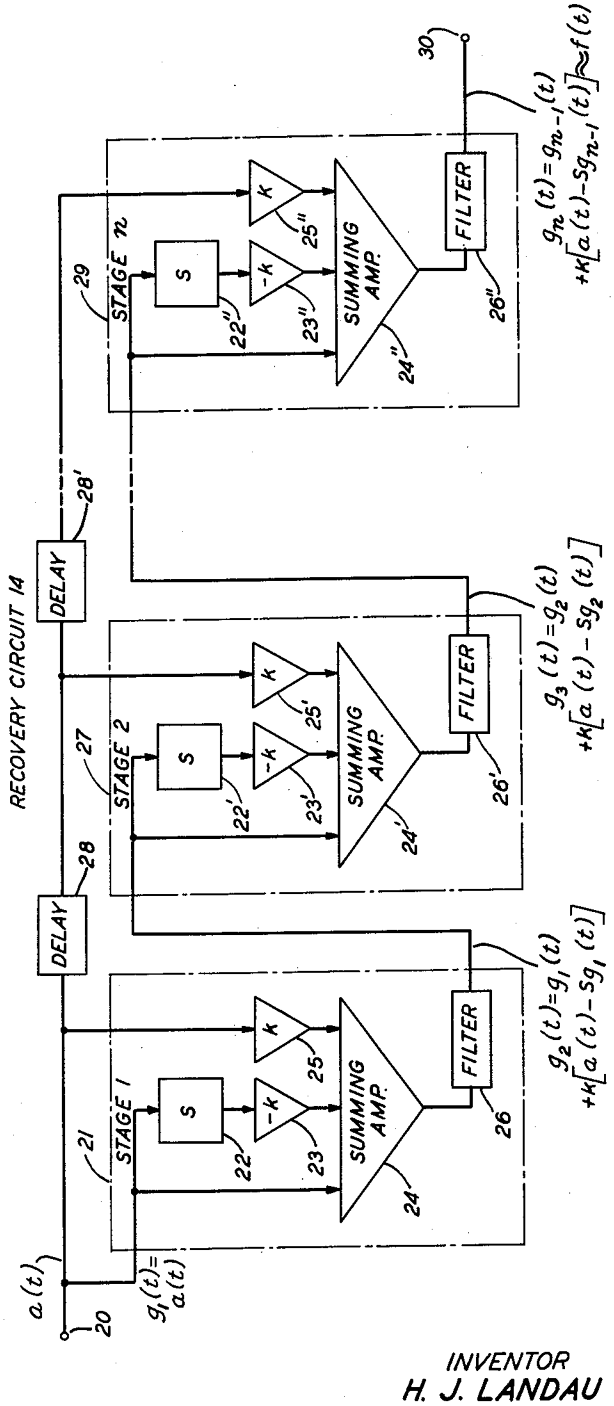

In the drawing:

FIG. 1 is a block schematic diagram of a companding system including a signal recovery circuit in accordance with the present invention; and FIG. 2 is a detailed schematic diagram of the signal recovery circuit of the present invention illustrated in block form in FIG. 1.

Referring more particularly to FIG. 1 of the drawing, there is shown a signal source 10 which may comprise, for example, a voice signal microphone, a tape or other signal reproducing means, or any other source of complex signals having wide range of amplitudes. The output of source 10 has been identified as a voltage having a waveform $f(t)$, and is, in general, limited in bandwidth.

The output of source 10 is introduced into a transmitter 11 which amplifies, modulates and otherwise prepares the signal $f(t)$ for transmission on a transmission link 12. In accordance with the present invention, transmitter 11 may include an amplitude range compressor or other non-linear operating device. Unambiguous signal recovery would, of course, require that the non-linear operation be monotonic in nature. The signal thus prepared is launched on a transmission link 12 which may comprise, for example, a telephone transmission line, a radio link, or any other form of transmission media and may also comprise a multiplexed medium in which the signal from source 10 is only one of many transmitted on the same transmission link.

As is common in most such transmission systems, transmission link 12 has a capacity for transmitting only a limited bandwidth, designed, of course, to transmit those frequencies found in the output of signal source 10. Due to the non-linear operation of portions of the transmitter 11, however, there may be signal components in the output of transmitter 11 which fall outside of this limited frequency range. These signal components are therefore lost.

At the far end of the transmission link 12 is a signal receiver 13 designed to recover the signal from link 12. Receiver 13 therefore includes detector circuits, demodulators, demultiplexers and any other of the well-known signal receiver circuits. Since some signal components were lost, however, receiver 13 will be unable to reproduce the signal launched on transmission line 12 and will instead produce a signal $a(t)$ which is a distorted version of $f(t)$.

The distorted signal $a(t)$ is introduced into a signal recovery circuit 14 which, in accordance with the present invention, produces an output signal $g_n(t)$ which may be as close an approximation to $f(t)$ as is desired. This signal is therefore introduced into a utilization means 15 which may comprise a telephone receiver, a loudspeaker or any other signal reproduction or recording apparatus.

FIG. 2 discloses the details of the signal recovery circuit of the present invention shown in block form in FIG. 1 as element 14. A distorted signal which has been subjected to compressing and band limiting is introduced at input terminal 20. This distorted signal is represented by $a(t)$. The signal recovery circuit comprises $n$ stages, only three of which have been illustrated, i.e., stage 1, stage 2 and stage $n$. The description of these three stages will suffice for a full understanding of the invention as embodied by any number of stages since each of the stages is essentially identical to every other stage.

Before proceeding with the description of FIG. 2 of the drawings, it is desirable to understand the basic principles upon which it is based. As noted above, when a signal $f(t)$ is transmitted over a transmission channel there is a tendency for the low amplitude part of $f(t)$ to become masked by the presence of channel noise, and for the high amplitude part of $f(t)$ to become distorted by the non-linear operation of overloaded components in the channel. It is therefore valuable to assign to the signal $f(t)$ another signal $\phi[f(t)]$, from which $f(t)$ can be recovered, but which has the property that its amplitude always lies in a middle range substantially above the channel noise amplitude and substantially below the amplitude which would cause overload. The signal $\phi[f(t)]$ can then be transmitted instead of the original $f(t)$. A signal such $\phi[f(t)]$ may be easily obtained by the process of compressing, i.e., increasing the amplitude of the low amplitude part of $f(t)$ and decreasing the amplitude of the high amplitude part of $f(t)$, on a monotonically varying amplitude compression curve.

A major drawback of instantaneous compressing is that this process destroys the band limits of the signal $f(t)$. That is, if $f(t)$ is limited in frequency between frequencies $f_1$ and $f_2$, the signal $\phi[f(t)]$ is not in general so limited. If the signal $\phi[f(t)]$ is sent over a channel which itself is capable of transmitting only the limited bandwidth, the signal will be distorted by the loss of signal components outside of the bandwidth of the channel, and a distorted signal $a(t)$ will be recovered rather than $\phi[f(t)]$.

It can be demonstrated that no information is lost in thus distoring $\phi[f(t)]$ and that $a(t)$, although it bears no simple relation to $f(t)$, is still sufficient to determine $f(t)$ uniquely. The present invention is directed to just such a method for recovering $f(t)$ from $a(t)$.

It can be further shown that for any compressed and band-limited signal $a(t)$, the sequence of functions $g_i(t)$, defined iteratively by $$g_{i+1}(t)=g_i+k[a(t)-Sg_i(t)] \quad (1)$$

converges uniformly on the whole time axis to a limit $g(t)$, where $k$ is a constant related to the companding curve and S represents the combined operations of compressing and band-limiting. Taking the limit on both sides of Equation 1 results in $$g(t)=g(t)+ka(t)-kSg(t) \quad (2)$$

or $$a(t)=Sg(t) \quad (3)$$

That is to say, the iterative procedure, applied to a signal $a(t)$, generates a succession of functions $g_k(t)$ which converge to the function $g(t)$ for which Equation 3 holds true. Since there can be only one such function, $g(t)$ must be precisely the signal $f(t)$, since $f(t)$ subjected to the operation S also produces $a(t)$.

The iteration process itself can be interpreted in these physical terms. The function $g_{i+1}(t)$ consists of the previous result, $g_i(t)$, corrected by a constant multiple of the difference between the received signal $a(t)$ and the signal which would have been received if $g_i(t)$ where subjected to the compressing and band-limiting signal channel, i.e., the operation S.

The convergence of this series is geometrical and the rate depends upon the choice of the constant $k$. The constant $k$ is chosen such that $$|1-k\phi'(x)|$$

is less than unity and preferably as small as possible, where $\phi'(x)$ is the slope of the compression curve over the desired range of operation.

Returning to FIG. 2, there is shown a scheme for implementing the iterative sequence of Equation 1. The received signal $a(t)$ is introduced at input terminal 20 and applied to a first approximating stage 21. The function $a(t)$, which also comprises the first approximation $g_1(t)$ to $f(t)$, is operated upon in a network 22 which simulates the operation of the transmission system. Network 22 could, for example, comprise a compressor and a band-limiting filter. It is noted, however, that a band-limiting filter would include a certain amount of delay which would have to be compensated for before the terms could be added together. This added compensation is avoided by separating the compressing process and the band-limiting process. Since the function $a(t)$ is already band-limited, passing it through a substantially identical filter does not further distort it. In this way, the summing process can be performed before the filtering.

The output of network 22 is applied to an inverting amplifier 23 having a gain equal to $k$. Amplifier 23 provides an output which is inverted with respect to its input, i.e., shifted 180 degrees in phase, and multiplied by a constant factor $k$. This output of amplifier 23 is applied to a summing amplifier 24. The received signal $a(t)$ is applied to the input of an amplifier 25 which also has a gain of $k$ but which does not invert its output. The output of amplifier 25 is also applied to summing amplifier 24.

The first approximation to $f(t)$, which comprises received signal $a(t)$ is also applied to summing amplifier 24. Summing amplifier 24 merely serves to generate the sum of the signals applied to its three input terminals and to provide a voltage indicative of this sum at its single output terminal. Such summing amplifiers are well known and will not be further discussed here.

The output of amplifier 24 is applied to a filter circuit 26 which simulates the frequency characteristics of the transmission medium indicated by the numeral 12 in FIG. 1. The output of filter 26 comprises the second approximation to $f(t)$ as specified by Equation 1.

A second stage 27 of approximation is provided to obtain an even closer approximation to the desired signal $f(t)$. It will be noted that stage 27 is identical in all respects to stage 21. That is, the previous approximation is applied directly to a summing amplifier 24' and through a network 22', simulating the compression characteristics of the transmission system, and an inverting amplifier 23' to summing amplifier 24'.

Since the second approximation is delayed with respect to the input signal $a(t)$ by the action of filter 26, a delay network 28 is provided to insert an equal delay in the path of the signal $a(t)$. Delay network 28 may advantageously comprise a filter similar to filter 26. The output of delay network 28 is applied through an amplifier 25' to summing amplifier 24'. The output of summing amplifier 24' is in turn applied to filter network 26' which also simulates the frequency characteristics of the transmission system. The output of filter 26' comprises the third approximation to $f(t)$ as specified by Equation 1.

It may be that two stages, or even a single stage, of approximation will produce a signal output sufficiently close to $f(t)$ to make further operations unnecessary. If that is the case, the output of the filter in the last stage will provide the desired output. In the more general case, however, $n$ stages of approximation will be required. Each of these stages includes the same elements as stages 21 and 27 described above and each successive stage produces an output which is a closer approximation to $f(t)$ than was the input to that stage.

The last stage, or stage $n$ is shown at 29. Stage 29 likewise comprises a network 22'', an inverting amplifier 23'', a summing amplifier 24'', an amplifier 25'' and a filter network 26''. These components are connected in the same way as shown in stages 21 and 27. A delay network 28', similar to delay network 28 is provided to equalize the delays in the path of $a(t)$ and the path through stage 27.

The output of stage 29 is applied to output terminal 30 and comprises the output of the recovery circuit. This output is applied to the utilization means corresponding to utilization means 15 in FIG. 1.

From the above description it can be seen that the signal ultimately recovered from the circuit of FIG. 2 can be made to approximate the desired signal $f(t)$ as closely as required merely by providing a sufficient number of stages. Furthermore, each of these stages is identical to all of the other stages, thus simplifying the manufacture of these stages. This property lends itself well to changes in the recovery circuit which might be desirable to accommodate changes in the requirements of the system.

The recovery circuit of the present invention is a single, self-contained unit which is located entirely at the receiving end of the system. It is therefore a simple matter to modify existing systems to take advantage of the invention.

The arrangements of the present invention have been described with respect to an amplitude compressed signal transmission system. The approximation process, however, is not inherently limited to the recovery of compressed and band-limited signals. It will provide an approximation of any signal subjected to a monotonic distorting characteristic provided that the proper characteristic is substituted for the compressing characteristic in the recovery circuit and that a suitable expression is utilized for the factor $k$.

It is to be understood that the above-described arrangements are merely illustrative of one embodiment of the invention. Numerous and varied other embodiments may readily be devised in accordance with the principles exemplified in this embodiment by those skilled in the art without departing from the spirit or scope of the invention.

What is claimed is:

1. In a distortion-producing signal transmission system having an intelligence-bearing input signal applied thereto and from which there is derived a corresponding but distorted output signal, means for recovering said input signal from said distorted output signal which recovering means comprises a plurality of approximating stages, each of said approximating stages comprising network means simulating the transmission characteristics of said system, means for applying the output of the previous one of said stages to said network means, means for differentially combining the output of said network means and said distorted output signal to form a difference, means for multiplying said difference by a preselected constant, and means for additively combining said multiplied difference and said output of said previous stage to form an approximation of said input signal closer than said previous stage output.

2. In combination, a signal source, signal translation means having non-linear signal distortion characteristics, and signal distortion reducing means, said distortion reducing means comprising network means having substantially the same signal distortion characteristics as said signal translation means, means for applying distorted signals to said network means, means for subtracting the output of said network means from said distorted signals to provide a difference signal, means for deriving a fixed proportion of said difference signal, and means for additively combining said fixed proportion and said distorted signal to reduce the distortions in said distorted signal.

3. The combination according to claim 2 wherein said signal translation means comprises amplitude compressor means, means for applying said intelligence-bearing signal to said amplitude compressor means, and signal transmission means connected to said amplitude compressor means and having a bandwidth less than the bandwidth of the output of said amplitude compressor means.

4. The combination according to claim 3 wherein said fixed proportion is chosen such that $$|1-k\phi'(x)|$$

is at a minimum, where $k$ is said predetermined constant and $\phi'(x)$ is the slope of the transmission characteristic of said compressor means.

5. In an amplitude compression and band-limited signal transmission system, a signal recovery circuit comprising a compressor, means for applying a compressed signal to said compressor, means for subtracting the output of said compressor from said compressed signal to form a difference signal, means for multiplying said difference signal by a preselected constant, means for adding said multiplied difference signal and said compressed signal to form a combined signal, and means for filtering said combined signal.

6. In a distortion producing signal transmission system having a transmission characteristic S, means for applying an input signal $f(t)$ to said transmission system, means for deriving a corresponding but distorted output signal $a(t)$ from said transmission system, means for recovering said input signal $f(t)$ from said distorted output signal $a(t)$ which recovering means comprises a plurality of substantially identical signal translating circuits each producing an output signal $g_n(t)$ which is given by $$g_n(t)=g_{n-1}(t)+k[a(t)-Sg_{n-1}(t)]$$

where $g_{n-1}(t)$ is the input of each of said translating circuits, and $k$ is a preselected function of said transmission characteristic, means for applying said distorted signal $a(t)$ to the input of a first one of said translating circuits, means for applying the output of each except the last of said translating circuits to the input of a succeeding one of said translating circuits, and means for deriving the signal $f(t)$ from the output of said last translating circuit.

References Cited in the file of this patent

UNITED STATES PATENTS

| | | |
|---|---|---|
| 2,776,410 | Guanella | Jan. 1, 1957 |
| 2,879,486 | Grandmont | Mar. 24, 1959 |